May 28, 1968

J. T. ROLAND ET AL 3,386,005

HIGH SPEED SELF-RESTORING SOLID STATE
OVERCURRENT PROTECTION CIRCUIT

Filed Aug. 6, 1965

INVENTOR.
JOHN THOMAS ROLAND
GEORGE GILMAN RICHARDS, JR.
RICHARD FARNER WELLS

BY Curtis, Morris + Safford

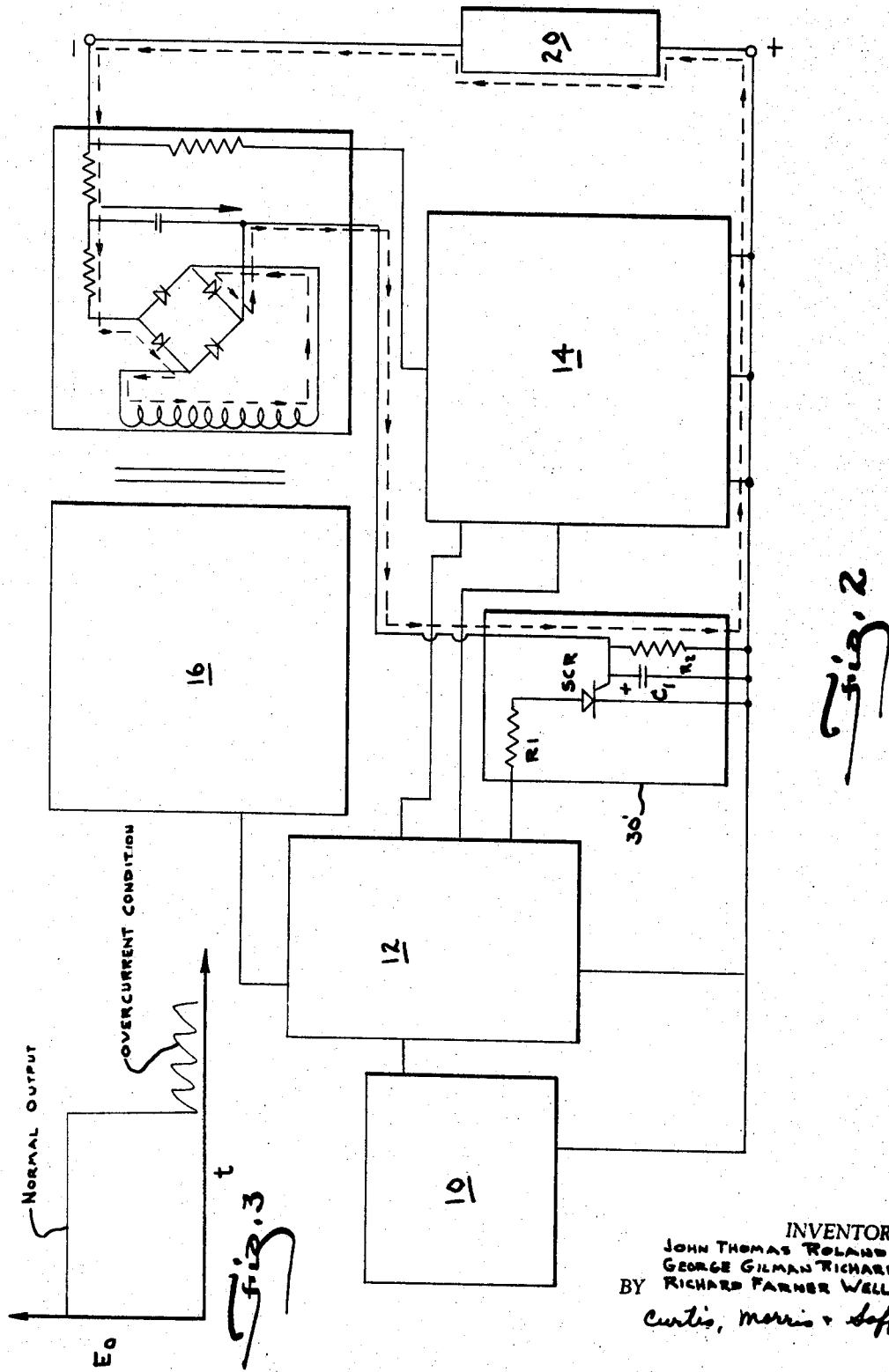

United States Patent Office 3,386,005
Patented May 28, 1968

3,386,005
HIGH-SPEED SELF-RESTORING SOLID STATE OVERCURRENT PROTECTION CIRCUIT
John Thomas Roland, Manheim, George Gilman Richards, Jr., Middletown, and Richard Farner Wells, Elizabethtown, Pa., assignors to AMP Incorporated, Harrisburg, Pa.
Filed Aug. 6, 1965, Ser. No. 477,717
10 Claims. (Cl. 317—22)

ABSTRACT OF THE DISCLOSURE

An SCR is connected in a power supply circuit to operate as a switch cutting on responsive to overload conditions and maintained off during normal circuit conditions to prevent overcurrents from damaging solid state components in the power supply circuit. An embodiment for a positive power supply features a connection of the electrodes of the SCR with the gate electrode grounded and with the cathode electrode in series with a resistor and ground, which resistor is placed in series with the load current of the power supply. A negative version of the protective circuit features a grounding of the cathode of the SCR and a connection of the gate electrode to the resistor which carries load current. The anode in both versions is connected to a point which must be maintained at a given voltage to maintain power supply operation. Conduction of the SCR draws potential present at this point to ground, cutting off the power supply for as long as an overload condition exists. The various connections to the SCR are direct to provide a fast on response of the switch to overload conditions and an automatic cut off of the switch once overload conditions cease.

---

Figure 1:
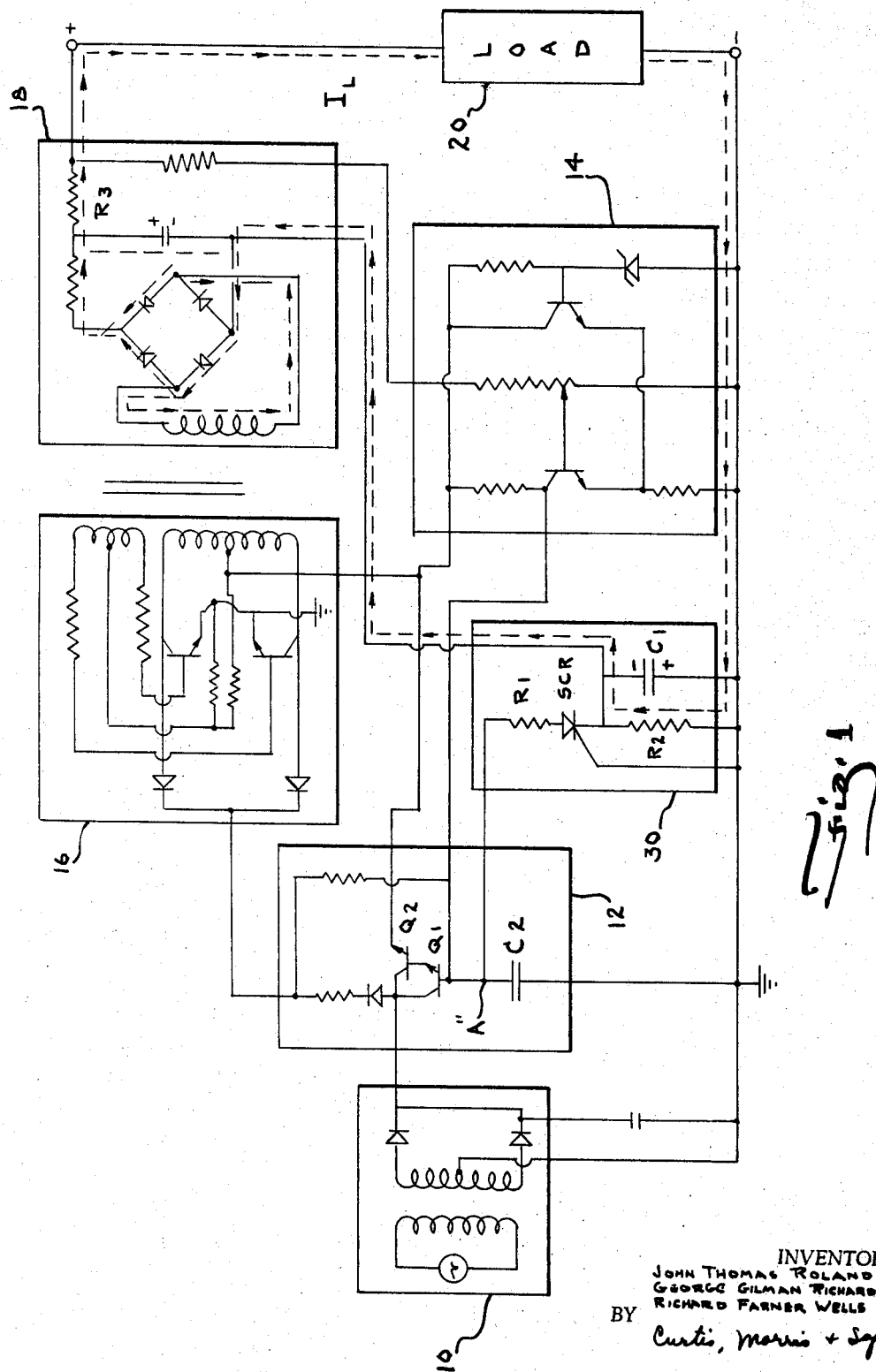

This invention relates to a circuit for providing providing protection to power supplies from overcurrent and short-circuit conditions.

Solid state power supplies require protection against overcurrent conditions which exceed the dissipation ratings of the various rectifiers and transistor switches of the circuit. In most applications fusing is not adequate because it is not fast enough and does not provide an automatic return upon the cessation of the over-current condition. The usual prior art approach for protection circuits is relatively complex, employing two or more transistors and a host of supporting diodes and resistors. Because of this the protective circuit frequently forms a significant part of the cost of the power supply. Another shortcoming with certain prior art devices is that a constant application of power is required to thus decrease the overall efficiency of the power supply and adversely affect the operating characteristics of the power supply served.

It is an object of the present invention to provide a protective circuit for solid state and other power supply devices which is simple, reliable and inexpensive. It is another object of the invention to provide a protective circuit which dissipates no power prior to activation, but is sufficiently fast in response to adequately protect transistor and diode components. It is still another object to provide a rugged solid state power supply circuit protective circuit which can accommodate overcurrents up to and including short circuit conditions. It is still another object of the invention to provide a solid state switch which utilizes an SCR in a novel manner.

The foregoing problems of the prior art are overcome and the objectives of the invention are achieved by employing a single SCR as a gate turned on by an overcurrent condition to reduce driving voltage at a critical point in the power supply circuit to a near ground potential thus effectively shutting off the power supply. The SCR is connected in circuit so that it is effectively cut off when the load current is reduced below an overcurrent condition. A supporting RC network is provided to prevent high frequency oscillations of the SCR in the presence of load conditions at or near overcurrent. The invention protective circuit is provided in embodiments for both positive and negative power supplies.

In the drawings:
FIGURE 1 is a schematic diagram of a positive output power supply including the protective circuit of the invention;
FIGURE 2 is a schematic diagram of a negative output power supply including the protective circuit of the invention in an alternative embodiment; and
FIGURE 3 is a load voltage-current plot showing the operation of the protective circuit of the invention.

Referring now to FIGURE 1 there is shown a positive power supply of the type utilized to provide a regulated DC supply from an AC input. Power supplies of this type are frequently used in mobile equipment such as in aircraft and ships. The types of loads served by such power supplies include CRT's, TWT's, PMT's and BW oscillators. In FIGURE 1, 10 represents a DC source. Block 12 is a Darlington amplifying stage and 14 represents a differential amplifier which serves to compare the output against a reference voltage. Block 16 is a Royer switching circuit adapted to serve as an inverter stage and block 18 is the secondary of the inverter which serves to convert the voltage to DC. These components are connected to supply a load 20 with a closely regulated DC voltage and current.

During operation the secondary of block 18 develops a driving load current $I_L$ which follows the path shown by the dotted line throught he load 20 to return through the protective circuit of the invention 30 as shown. The protective circuit includes a pair of resistances $R_1$ and $R_2$ connected respectively to the anode and cathode of a single SCR having its gate electrode tied to ground. $R_1$ serves to limit the anode current to the rating of the SCR. The anode of the SCR is tied to $R_1$ and to a point labeled A connected to the base of the $Q_1$ transistor of the Darlington amplified in block 12. A capacitor $C_1$ is connected between the SCR cathode and ground and is in parallel with $R_2$ relative to a return lead to the full-wave rectifier in block 18. $C_1$ serves to filter out spikes which might otherwise affect the operation of SCR, i.e., might gate the SCR on before an undesirable load condition exists. During normal operation the power supply functions with block 12 driving block 16 which in turn drives the secondary of block 18. At this time capacitor $C_2$ is charged up to the regulated Voltage $E_0$ plus the sum of the base to emitter drops of $Q_1$ and $Q_2$. The resistor $R_1$ is chosen to have a value relative to this voltage to limit the anode current to the SCR to a value well below its rating. The value of $R_2$ is chosen relative to the gate firing voltage of the SCR and relative to the desired overload firing point of the SCR. This value must of course be held as small as possible, since it is in the load circuit producing the drop $I_LR_2$. The magnitude of $R_2$ should be sufficient to define a leakage current to effectively compensate for the gate characteristics to change with changes in temperature. In conjunction with the circuit of the invention, there is provided in block 18 a resistor $R_3$ which serves for current limiting purposes during peak discharge when a short occurs in a load. Preferably the value of $R_3$ should be on the order of 3 to 5 ohms per output volt.

From the foregoing it should be apparent that during normal operation the SCR in conjunction with $R_1$ and $R_2$ and $C_1$ are chosen such that the SCR is off. When an overcurrent condition occurs, the drop $I_LR_2$ increases to a point which turns the SCR on causing $C_2$ to discharge through $R_1$. This pulls down the voltage at A to a near ground potential and cuts back $Q_1Q_2$ and cuts off the Royer circuit. At some point before $C_2$ is completely discharged this current will drop below the holding current level required by the SCR and it will revert to the off-blocking-state permitting the regulated voltage to again charge $C_2$ and cause the Royer circuit to start switching once again. If the overcurrent condition still exists, the SCR will again be fired to discharge $C_2$ and then cut off. This process will be repeated as long as an overcurrent condition exists. FIGURE 3 shows a voltage current plot representing the operation of the circuit of FIGURE 1 in the presence of a continued overload condition. The frequency of the oscillations of on-off operation is determined by the time constant of $(R_1+R_2) C_2$. For this reason, $C_2$ must therefore be larger than normally required in order to prevent closed-loop, high frequency oscillations in the circuit.

From the foregoing it should be apparent that the circuit of the invention provides an absolute overcurrent or overload protection to the power supply of FIGURE 1 through a novel use of an SCR, two resistors and a single capacitor. This circuit has fast response .1 microsec. and no power requirement prior to activation. It will operate as well during short-circuit as during limited overload and since the basic component is an SCR, it is extremely rugged and reliable.

The alternative embodiment for a negative power supply is shown in FIGURE 2 wherein the roles of the various components are substantially identical. In FIGURE 2 the value of $R_2$ may be substantially lower than in the positive power supply protective circuit because the feedback current does not produce a reverse drop across it. The SCR is again chosen in accordance with the value of the load current $I_L$. Again, the SCR holding current requirement must be high enough so that the load current through the starting circuit will not hold the SCR in condition.

In an actual circuit for a positive power supply operable to supply a load with requirements of voltage equal to 10 kv. and current equal to 1 ma. from a supply in 10 of 115 v. AC and 170 ma. with a normal variation in load current from 0 to 1 ma., the active circuit of the invention contained the following components:

SCR _____ 2N1882, SSPI
$C_1$ _____ 20μf., 12 v. DC, Sprague
$R_1$ _____ 33Ω, ½ w., Ohmite
$R_2$ _____ 150Ω, ½ w., Ohmite
$C_2$ _____ 1μf., 50 v. DC, Sprague
$R_3$ _____ 3300Ω, 2 w., Ohmite

What is claimed is:

1. In a power supply having solid state devices requiring protection against overcurrent and short circuit load conditions, a protective circuit comprising a solid state switch having anode, cathode and gate electrodes its cathode-anode electrodes in series with a circuit point in the supply which requires a substantial voltage level to maintain supply operation, and a ground path of said supply, and external resistance connected in said protective circuit to hold said switch normally off, a circuit path including a portion of said external resistance carrying the supply load current directly connected to said switch through either the gate or cathode electrodes thereof with the remaining electrode being connected to the ground path of said supply, said portion of said external resistance being of a value such that upon said load current exceeding a desired value the voltage drop thereacross serves to cause said switch to conduct and drop the voltage at said circuit point to effectively cut off said supply until the said load current is reduced to a value wherein said voltage drop across the portion of said external resistance is below the value sufficient to maintain conduction of said switch.

2. The circuit of claim 1 wherein the said switch is an SCR.

3. The circuit of claim 2 wherein the gate electrode of the SCR is grounded and the said portion of the external resistance is in series with the cathode electrode of the SCR so that said circuit is operable with a positive power supply.

4. The circuit of claim 2 wherein the cathode electrode is grounded and the said portion of the external resistance is in series with ground from the gate electrode making said circuit operable with a negative power supply.

5. In a power supply having solid state devices requiring protection against overcurrents and overload conditions, a supply circuit for developing a load current and voltage including an amplifier having a circuit point held to a given voltage to maintain operation of said supply by the charge on a capacitor, means for charging said capacitor, a protective circuit connected to said point including a solid state switch connected to ground, the characteristics of said switch and the external resistance in the switch circuit being such as to hold said switch off during normal circuit load conditions, circuit means connected to said switch to develop a voltage causing switch conduction responsive to load current above a normal condition whereby said capacitor is temporarily discharged to drop the potential at said point and cut off said supply until said capacitor is recharged, whereby said switch is alternatively gated on and allowed to cut off in repetitive fashion for as long as said overcurrent condition exists.

6. The circuit of claim 5 wherein means is provided to limit oscillations in the operation of said switch circuit.

7. In a switch device adapted to be gated on responsive to an increase in circuit load, the circuit comprising a solid state switch having cathode-anode and gate electrodes, a voltage source connected to said anode electrode with one of the said cathode or gate electrodes being connected directly to ground and the other electrode being directly connected to a resistance in series with the circuit load, the said resistance being of a value to develop a potential causing said device to conduct responsive to given load circuit value, there being a further resistance connected in series with said voltage source and said anode electrode which presents in conjunction with said first mentioned resistance a circuit resistance of a value to develop a drop of said source voltage to a value below that necessary for a holding current to flow through said switch without the presence of said potential whereby said switch is gated on responsive to overcurrents and is permitted to cut off in the absence of overcurrents.

8. The device of claim 7 wherein said switch is an SCR.

9. The device of claim 8 wherein said gate electrode is grounded and said device is connected for use with a circuit load having a load current positive with respect to said cathode electrode.

10. The device of claim 8 wherein said cathode is grounded and said device is utilized with a circuit load having a current flowing therethrough wherein said cathode is negative.

References Cited

UNITED STATES PATENTS

| | | | |
|---|---|---|---|
| 3,192,441 | 6/1965 | Wright | 317—33 |
| 3,218,542 | 11/1965 | Taylor | 317—33 X |
| 3,246,206 | 4/1966 | Chowdhuri | 317—31 |
| 3,303,388 | 2/1967 | Means | 317—33 |
| 3,311,787 | 3/1967 | Gunderman | 317—33 |

MILTON O. HIRSHFIELD, *Primary Examiner.*

R. V. LUPO, *Assistant Examiner.*